(12) United States Patent
Moravek et al.

(10) Patent No.: US 9,640,079 B1
(45) Date of Patent: May 2, 2017

(54) METHODS AND SYSTEMS FACILITATING HOLDING FOR AN UNAVAILABLE DESTINATION

(71) Applicant: HONEYWELL INTERNATIONAL INC., Morris Plains, NJ (US)

(72) Inventors: Zdenek Moravek, Rozdrojovice (CZ); Robert Sosovicka, Brno (CZ); Filip Magula, Albrechtice (CZ); David Kunes, Tisnov (CZ); Katerina Sprinarova, Hradec Kralove (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/019,675

(22) Filed: Feb. 9, 2016

(51) Int. Cl.
*G01C 21/00* (2006.01)
*G08G 5/00* (2006.01)

(52) U.S. Cl.
CPC .................. *G08G 5/0047* (2013.01)

(58) Field of Classification Search
CPC .................................................... G08G 5/0047
See application file for complete search history.

(56) References Cited

U.S. PATENT DOCUMENTS

| | | |
|---|---|---|
| 5,398,186 A | 3/1995 | Nakhla |
| 5,842,142 A | 11/1998 | Murray et al. |
| 6,199,008 B1 | 3/2001 | Aratow et al. |
| 6,542,796 B1 | 4/2003 | Gibbs et al. |
| 7,499,771 B2 | 3/2009 | Caillaud |
| 7,796,055 B2 | 9/2010 | Clark et al. |
| 7,908,078 B2 | 3/2011 | He |
| 7,963,618 B2 | 6/2011 | Stone et al. |
| 8,010,242 B1 | 8/2011 | Ginsberg et al. |
| 8,026,831 B2 | 9/2011 | Muramatsu et al. |
| 8,112,186 B2 | 2/2012 | Sylvester |
| 8,214,136 B2 | 7/2012 | Caillaud |

(Continued)

FOREIGN PATENT DOCUMENTS

| | | |
|---|---|---|
| EP | 2574965 A2 | 4/2013 |
| EP | 2790168 A2 | 10/2014 |

(Continued)

OTHER PUBLICATIONS

ForeFlight Mobile Product Page Nov. 19, 2015; Reference Notes Last accessed at http://foreflight.com/products/foreflight-mobile.

(Continued)

*Primary Examiner* — Adam Alharbi
(74) *Attorney, Agent, or Firm* — Lorenz & Kopf, LLP

(57) ABSTRACT

Methods and systems are provided for generating an interim route that facilitates navigating a vehicle to an intended destination. One exemplary method facilitating an aircraft landing at an intended destination involves obtaining a current position of the aircraft, obtaining one or more time constraints for the intended destination, determining an interim route from the current aircraft position to the intended destination that veers towards a conditional diversion destination based at least in part on the one or more time constraints for the intended destination, and providing indication of the interim route to an aircraft operator, for example, by displaying a graphical representation of the interim route on a navigational map on a display device.

14 Claims, 9 Drawing Sheets

(56) References Cited

U.S. PATENT DOCUMENTS

| | | | |
|---|---|---|---|
| 8,292,234 | B2 | 10/2012 | Shuster |
| 8,521,343 | B2 | 8/2013 | Spinelli |
| 8,554,457 | B2 | 10/2013 | White et al. |
| 8,565,944 | B1 | 10/2013 | Gershzohn |
| 8,612,070 | B2 | 12/2013 | Geoffroy et al. |
| 8,676,481 | B2 | 3/2014 | Coulmeau et al. |
| 8,849,478 | B2 | 9/2014 | Coulmeau et al. |
| 9,047,769 | B2 | 6/2015 | Lafon et al. |
| 9,064,407 | B2 | 6/2015 | Otto et al. |
| 9,098,996 | B2 | 8/2015 | Barraci et al. |
| 9,310,222 | B1 | 4/2016 | Suiter et al. |
| 2008/0300737 | A1 | 12/2008 | Sacle et al. |
| 2009/0150012 | A1 | 6/2009 | Agam et al. |
| 2009/0171560 | A1 | 7/2009 | McFerran et al. |
| 2011/0264312 | A1 | 10/2011 | Spinelli et al. |
| 2012/0218127 | A1 | 8/2012 | Kroen |
| 2013/0001355 | A1 | 1/2013 | Cox et al. |
| 2013/0046422 | A1 | 2/2013 | Cabos |
| 2013/0090842 | A1 | 4/2013 | Stabile |
| 2013/0179011 | A1 | 7/2013 | Colby et al. |
| 2013/0304349 | A1* | 11/2013 | Davidson ............ G08G 1/0112 701/99 |
| 2014/0278056 | A1* | 9/2014 | Williams ............ G01C 21/3476 701/410 |
| 2014/0309821 | A1 | 10/2014 | Poux et al. |
| 2014/0343765 | A1 | 11/2014 | Suiter et al. |
| 2015/0015421 | A1* | 1/2015 | Krijger ................ G08G 1/0129 340/932 |
| 2015/0081197 | A1 | 3/2015 | Gaertner et al. |
| 2015/0241295 | A1 | 8/2015 | Fuscone et al. |
| 2015/0279218 | A1 | 10/2015 | Irrgang et al. |
| 2015/0371544 | A1 | 12/2015 | Mere |

FOREIGN PATENT DOCUMENTS

| | | | |
|---|---|---|---|
| WO | 2007006310 | A2 | 1/2007 |
| WO | 2013162524 | A1 | 10/2013 |

OTHER PUBLICATIONS

AVPlan EFB Plan Faster, Fly Sooner Nov. 19, 2015; Reference Notes Last accessed at http://www.avplan-efb.com/avplan.

AivlaSoft Electronic Flight Bag—Cockpit efficiency and situational awareness Nov. 19, 2015; Reference Notes Last accessed at http://www.aivlasoft.com/index.html.

Iopscience Landing on empty: estimating the benefits from reducing fuel uplift in US Civil Aviation, iopscience Dec. 31, 2015; Reference Notes http://iopscience.iop.org/article/10.1088/1748-9326/10/9/094002/pdf.

Stackexchange aviation http://aviation.stackexchange.com/ Dec. 31, 2014; Reference Notes http://aviation.stackexchange.com/questions/2854/when-are-aircraft-required-to-dump-fuel-for-emergency-landings.

What to Consider Overweight Landing? aero quarterly Dec. 31, 2007; Reference Notes http://www.boeing.com/commercial/aeromagazine/articles/qtr_3_07/AERO_Q307_article3.pdf.

Haroon, K; FMC Alternate Airport and Diversion; The Airline Pilots Forum & Resource, 2012.

Atkins, E.M. et al.; Emergency Flight Planning Applied to Total Loss of Thrust; Journal of Aircraft vol. 43, No. 4, Jul.-Aug. 2006.

Moravek, Z. et al.; Methods and Systems for Safe Landing at a Diversion Airport; filed Feb. 9, 2016 and assignee U.S. Appl. No. 15/019,650.

Moravek, Z. et al.; Methods and Systems Facilitating Holding for an Unavailable Destination; filed Feb. 9, 2016 and assigned U.S. Appl. No. 15/019,675.

Moravek, Z. et al.; Methods and Systems for Presenting Diversion Destination; filed Nov. 30, 2015 and assigned U.S. Appl. No. 14/953,635.

FlightGear Forum; Using a Canvas Map in the GUI; 2012.

Automated Ceiling Reports ForeFlight; 2015.

IPad Pilot News; 10 Tips to Increase Your Runway Awareness with ForeFlight; 2015.

Moravek, Z. et al.; Methods and Systems Facilitating Stabilized Descent to a Diversion Airport; filed Feb. 18, 2016 and assigned U.S. Appl. No. 15/047,355.

Moravek, Z. et al.; Methods and Systems for Conveying Destination Viability; filed May 3, 2016 and assigned U.S. Appl. No. 15/145,346.

Chmelarova et al.; Methods and Systems for Presenting En Route Diversion Destinations; filed Sep. 7, 2016 and assigned U.S. Appl. No. 15/258,400.

Moravek, Z. et al.; Flight Plan Segmentation for En Route Diversion Destinations; filed Nov. 21, 2016 and assigned U.S. Appl. No. 15/357,086.

* cited by examiner

METHODS AND SYSTEMS FACILITATING HOLDING FOR AN UNAVAILABLE DESTINATION

TECHNICAL FIELD

The subject matter described herein relates generally to vehicle systems and related displays, and more particularly, embodiments of the subject matter relate to aircraft systems capable of facilitating holding for an unavailable destination in a manner that reduces a pilot's workload.

BACKGROUND

Pilots, air traffic controllers, airline personnel and the like routinely monitor meteorological data, reports, and forecasts to assess any potential impacts on the current or anticipated flight plan and the intended destination. At times, meteorological conditions may impact the availability of an airport for an indeterminate amount of time. Because diverting can be an inconvenience and increase costs, it is often desirable to wait and prolong flight in the hopes of the availability of an intended airport improving. To do so, however, a pilot must be cognizant of the amount of fuel remaining onboard with respect to the current distance or estimated flight time for reaching an alternative destination with sufficient fuel, while also accounting for meteorological conditions en route to that destination and other factors effecting operations. This requires the pilot gather and integrate information from numerous available sources, make numerous assumptions (e.g., regarding fuel consumption, trends in meteorological conditions, and the like), and manually assess the risks and costs versus the benefits in determining whether or when to divert. As a result, the pilot's workload is increased and the pilot's situational awareness with respect to other operations of the aircraft may decrease. Additionally, stress or other factors may increase the likelihood of errors or otherwise impair the pilot's judgment, which may be further hindered when the pilot is inexperienced with such situations. Accordingly, it is desirable to reduce the mental workload of the pilot (or air traffic controller, or the like) and provide accurate and reliable guidance operations during a complex situation.

BRIEF SUMMARY

Methods and systems are provided for generating an interim route for a vehicle, such as an aircraft, that facilitates navigating the vehicle to an intended destination in a manner that considers a conditional destination for the vehicle. One exemplary system includes a display device having a map associated with a vehicle displayed thereon, an input device to obtain one or more time constraints for an intended destination for the vehicle, and a processing system coupled to the display device and the input device. The processing system constructs an interim route from a current position of the vehicle to the intended destination that deviates towards a conditional diversion destination based at least in part on the one or more time constraints for the intended destination, and displays a graphical representation of the interim route on the map on the display device.

In another embodiment, a method of facilitating an aircraft landing at an intended destination is provided. The method involves obtaining a current position of the aircraft, obtaining one or more time constraints for the intended destination, determining an interim route from the current position to the intended destination that veers towards a conditional diversion destination based at least in part on the one or more time constraints for the intended destination, and displaying a graphical representation of the interim route on a display device.

Another exemplary method involves obtaining, from a system onboard a vehicle, a current position of the vehicle, obtaining an indication of an estimated availability time for a destination for the vehicle, identifying a conditional destination for the vehicle, constructing a route from the current position of the vehicle and terminating at the destination that deviates towards the conditional destination, and displaying a graphical representation of the route on a display device. An estimated arrival time at the destination for the route is at or after the estimated availability time.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
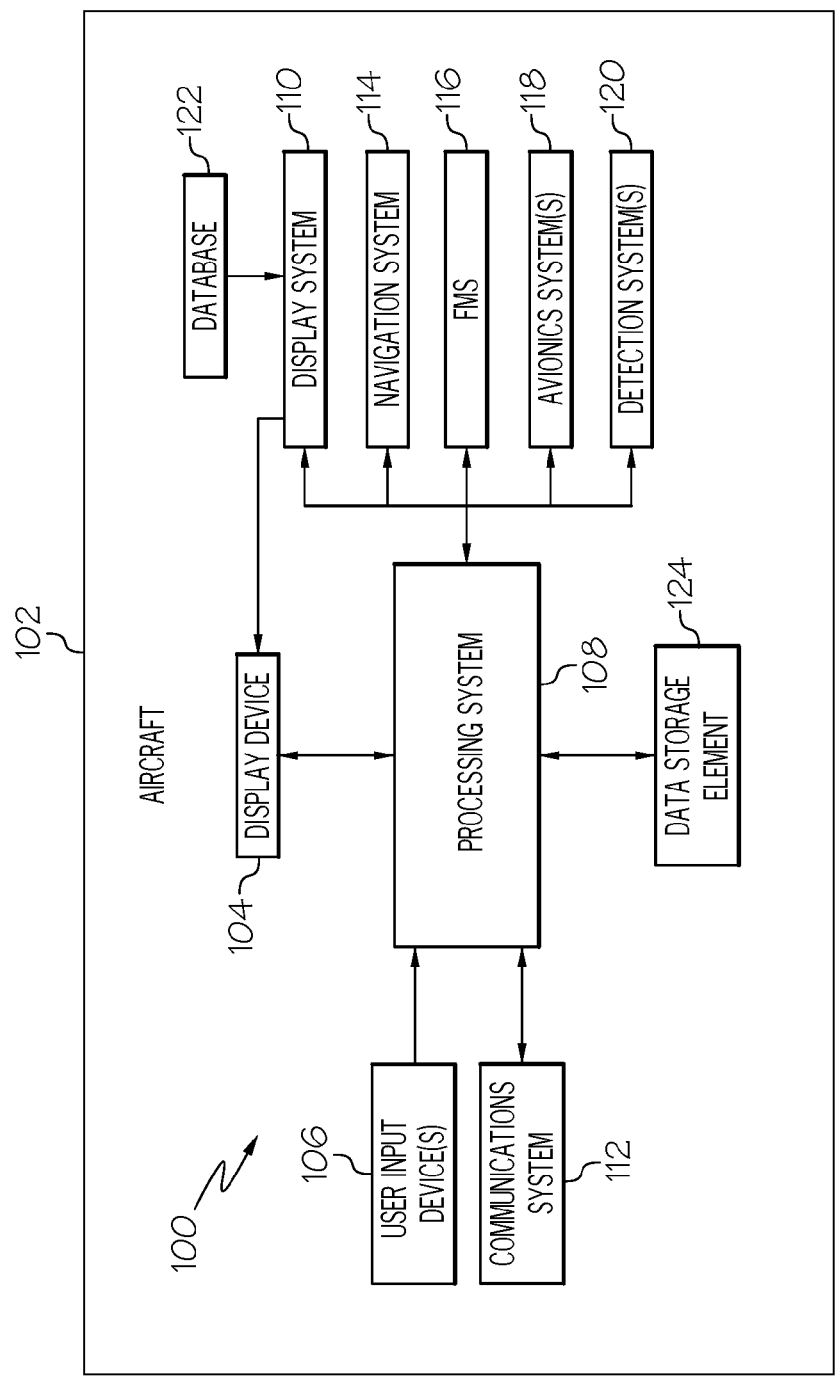
FIG. 1 is a block diagram of a system for an aircraft in an exemplary embodiment.

Embodiments of the subject matter described herein generally relate to systems and methods for facilitating a vehicle operator intending to access an indeterminately unavailable destination. For example, a pilot may desire to hold as long as possible for landing at an originally scheduled destination airport before diverting to another airport. Embodiments described herein construct an interim route or path to the intended destination airport from the current aircraft position that deviates or veers towards a diversion airport to facilitate holding for the intended destination while also satisfying applicable constraints (e.g., time, fuel, and the like) for operating the aircraft and accounting for meteorological conditions, aircraft configuration, and/or other factors. In other words, the interim route emanates, originates, or otherwise starts from the current aircraft position and traverses in a manner that veers towards the identified diversion destination before redirecting and terminating or ending at the intended destination. The interim route satisfies any applicable time constraints associated with the intended destination, for example, by terminating at the intended destination at an estimated arrival time at which the intended destination is expected to be available while also staying with in a threshold flight time of the intended destination (e.g., to facilitate earlier landing in the event the intended destination becomes available earlier than anticipated). Additionally, the interim route may satisfy any applicable fuel constraints (e.g., by traversing a relatively fuel efficient route that ensures minimum fuel requirements are met) or other safety constraints to ensure that the aircraft is capable of landing alternately at either the intended destination or the diversion destination from any position along the route. In this regard, the interim route may be configured to minimize fuel consumption while holding while also minimizing the required fuel or estimated flight time for reaching the diversion destination in the event the unavailability of the intended destination persists.

In exemplary embodiments, the interim holding route is displayed or otherwise presented to the pilot to facilitate operation of the aircraft to hold for the intended destination in a safe manner that accounts for the potential need to divert to another destination. Additionally, in some embodiments, the interim holding route may automatically be inserted into the flight plan in lieu of the originally planned route from the current aircraft position to the intended destination to support automatically traveling the route (e.g., using autopilot). In one or more exemplary embodiments, the interim holding route is dynamically updated to reflect changes in meteorological conditions, fuel remaining, destination status, destination time constraints, aircraft position, and potentially other factors effecting the viability of holding for the intended destination. Thus, as the actual or real-time fuel consumption or meteorological conditions deviate from what was originally predicted upon initial generation of the route, the interim holding route may be updated to reflect real-time conditions to ensure applicable constraints are still satisfied. While the subject matter is primarily described herein in the context of presenting an interim holding route for an aircraft at an intended destination airport prior to deviating from the flight plan, the subject matter described herein may be similarly utilized in other applications or in the context of other types of vehicles (e.g., automobiles, marine vessels, trains, or the like). That said, for purposes of explanation, but without limitation, the subject matter is described herein in the context of presenting information pertaining to aircraft operations.

Referring now to FIG. 1, an exemplary embodiment of a system 100 which may be located onboard a vehicle, such as an aircraft 102, includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122, 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, wherein the processing system 108 and the display system 110 are cooperatively configured to display, render, or otherwise convey one or more graphical representations or images associated with operation of the aircraft 102 on the display device 104. For example, as described in greater detail below, a navigational map that includes a graphical representation of the aircraft 102 and one or more of the terrain, meteorological conditions, airspace, air traffic, navigational reference points, and a route associated with a flight plan of the aircraft 102 may be displayed, rendered, or otherwise presented on the display device 104.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100, as described in greater detail below. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element 124, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map.

As described in greater detail below, in an exemplary embodiment, the processing system 108 includes or otherwise accesses a data storage element 124 (or database), which maintains information regarding airports and/or other potential landing locations (or destinations) for the aircraft 102. In this regard, the data storage element 124 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in accordance with one or more embodiments, the data storage element 124 also maintains status information for the runways and/or taxi paths at the airport indicating whether or not a particular runway and/or taxi path is currently operational along with directional information for the taxi paths (or portions thereof). The data storage element 124 may also be utilized to store or maintain other information pertaining to the airline or aircraft operator (e.g., contractual agreements or other contractual availability information for particular airports, maintenance capabilities or service availability information for particular airports, and the like) along with information pertaining to the pilot and/or co-pilot of the aircraft (e.g., experience level, licensure or other qualifications, work schedule or other workload metrics, such as stress or fatigue estimates, and the like).

Still referring to FIG. 1, in an exemplary embodiment, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference).

In an exemplary embodiment, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historic meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102, as described in greater detail below in the context of FIG. 9. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Figure 2:
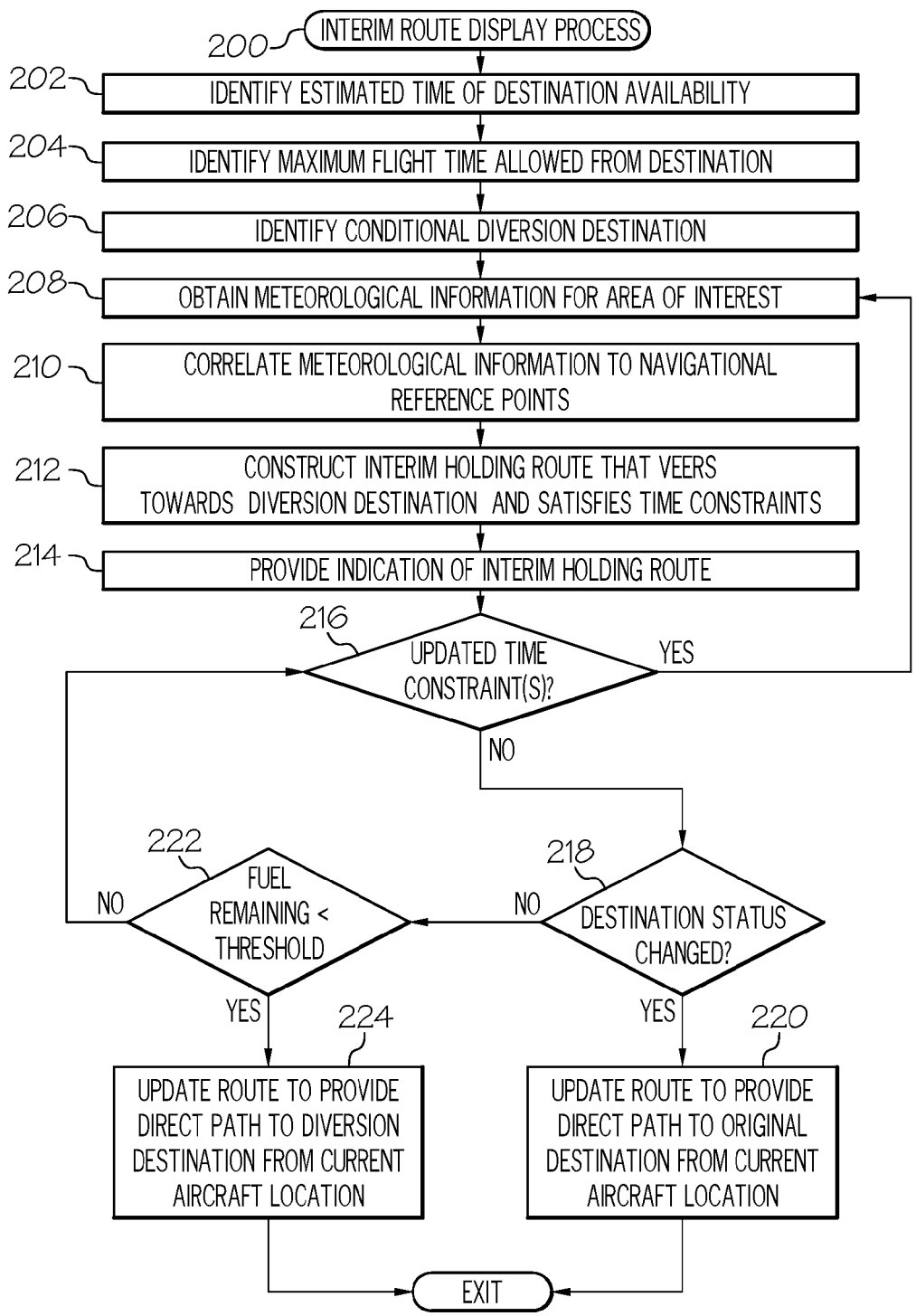
FIG. 2 is a flow diagram of an exemplary interim route display process suitable for use with the aircraft in the system of FIG. 1 in accordance with one or more embodiments.

Referring now to FIG. 2, in an exemplary embodiment, the system 100 is configured to support an interim route display process 200 and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the interim route display process 200 may be performed by different elements of the system 100, such as, the processing system 108, the display system 110, the communications system 112, the navigation system 114, the FMS 116, the onboard avionics systems 118 and/or the onboard detection systems 120. It should be appreciated that the interim route display process 200 may include any number of additional or alternative tasks, the tasks need not be performed in the illustrated order and/or the tasks may be performed concurrently, and/or the interim route display process 200 may be incorporated into a more comprehensive procedure or process having additional functionality not described in detail herein. Moreover, one or more of the tasks shown and described in the context of FIG. 2 could be omitted from a practical embodiment of the interim route display process 200 as long as the intended overall functionality remains intact.

Still referring to FIG. 2, and with continued reference to FIG. 1, in an exemplary embodiment, the interim route display process 200 begins by identifying or otherwise obtaining one or more time constraints associated with the originally intended destination that is currently unavailable or otherwise predicted to be unavailable at the originally scheduled (or estimated) arrival time (task 202, 204). In exemplary embodiments, the interim route display process 200 obtains an estimated time when the planned destination airport is expected to be available for landing the aircraft 102. In one or more embodiments, the estimated availability time is input or otherwise provided to the processing system 108 by a user via the user input device 106. In other embodiments, the processing system 108 may receive the estimated availability time via another system 112, 114, 116, 118 onboard the aircraft 102, for example, by parsing communications from an air traffic controller or other messages received by the aircraft 102 (e.g., automatic terminal information service (ATIS) messages, notice to airmen (NOTAM) messages, or the like). Additionally, the interim route display process 200 obtains a maximum allowable flight time distance from the intended destination. In this regard, the maximum allowable flight time defines the distance, in terms of the estimated flight time, that the interim holding route may veer away from the intended destination towards a diversion destination. In one or more embodiments, the maximum allowable flight time distance is input or otherwise provided to the processing system 108 by a user via the user input device 106. In other embodiments, the maximum allowable flight time distance may be stored or otherwise maintained in the data storage element 124 onboard the aircraft 102.

The illustrated interim route display process 200 also identifies or otherwise determines a conditional diversion destination in the event that the unavailability of the intended destination persists (task 206). In some embodiments, the processing system 108 receives indication of the desired conditional diversion destination from a user via the user input device 106. In other embodiments, the processing system 108 may automatically select or otherwise identify a conditional diversion destination from among a plurality of potential diversion destinations based on one or more factors, such as, for example, the current position of the aircraft 102 relative to the respective diversion destinations, the current fuel remaining onboard the aircraft 102 (or the current aircraft range), current meteorological conditions at the respective diversion destinations, current runway status at the respective diversion destinations, and the like.

After identifying the conditional diversion destination, the interim route display process 200 obtains meteorological information for an aircraft operating region of interest (task 208). In this regard, the aircraft operating region of interest corresponds to a geographical area encompassing the location of intended destination, the location of the conditional diversion destination, and the current location of the aircraft 102. The processing system 108 obtains current or real-time meteorological information for points within the aircraft operating region from one or more of the onboard detection system(s) 120 and/or any external weather monitoring system(s) via the communications system 112.

Additionally, the processing system 108 may obtain forecasted meteorological information for points within the aircraft operating region from one or more of the onboard detection system(s) 120 and/or any external weather monitoring system(s) for forecast time periods between the current time and the estimated time when the planned destination airport is expected to be available. It should be noted that the obtained meteorological information may be three-dimensional within the lateral geographic area encompassing the intended destination, the conditional diversion destination, and the current aircraft location to account for potential changes in the flight level or altitude of the aircraft 102.

The illustrated process 200 continues by correlating or otherwise translating the meteorological information to navigational reference points within that region (task 210). That is, the meteorological data points are essentially translated from a meteorological weather grid domain to a navigational reference point domain that can be utilized for navigating the aircraft 102. In this regard, the processing system 108 correlates or otherwise translates the meteorological information for points within the aircraft operating region to nearby navigational reference points within the aircraft operating region (e.g., waypoints, airways, and/or other navigational aids). In this regard, meteorological information corresponding to different locations within the aircraft operating region may be integrated, fused, extrapolated, interpolated, or otherwise combined to achieve likely meteorological information at or near the location associated with a particular navigational reference point that may be utilized for navigating the aircraft 102. Moreover, in some embodiments the meteorological information corresponding to different locations within the aircraft operating region may be integrated, fused, extrapolated, interpolated, or otherwise combined to achieve likely meteorological information for points along airways or points that otherwise intervene between navigational reference points or between the aircraft 102 and respective navigational reference points.

Based on the current position of the aircraft, the respective locations of the intended destination and the conditional diversion destination, the applicable time constraints or other safety constraints, and the obtained meteorological information, the interim route display process 200 generates or otherwise constructs a route from the current aircraft position to the intended destination that satisfies the applicable constraints while also veering towards the conditional diversion destination (task 212). In this regard, an interim holding route is a sequence of navigational reference points and associated altitudes or flight levels that define a three-dimensional flight path configured to reduce the amount of flight time and/or fuel required to reach the conditional diversion destination in the event of a diversion while accounting for the possibility of the intended destination becoming available. To this end, the interim holding route is configured to maintain the aircraft 102 within the maximum allowable flight time distance of the intended destination and return to the intended destination at or around the estimated availability time while also accounting for the meteorological conditions and likely fuel consumption to ensure that at least a minimum amount of fuel required for the aircraft 102 to reach the diversion destination from the end of the route. In one or more embodiments, the processing system 108 iteratively analyzes navigational reference points within the aircraft operating region in conjunction with the forecasted or predicted weather at the respective navigational reference points at the predicted time of the aircraft 102 traversing the respective navigational reference points in conjunction with the predicted aircraft configuration and fuel consumption to arrive at a relatively fuel efficient route that satisfies the applicable time constraints. In embodiments where the route arrives at the intended destination prior to the estimated availability time, the interim route display process 200 assumes a holding pattern at the intended destination. In this regard, the processing system 108 may also calculate or otherwise determine an amount of time that the aircraft 102 is capable of holding at the intended destination based on the forecasted meteorological information at or near the intended destination, the estimated fuel remaining when the aircraft 102 is predicted to arrive at the intended destination, and the minimum amount of fuel required to reach the diversion destination from the intended destination.

Still referring to FIG. 2, the interim route display process 200 generates or otherwise provides indication of the constructed route (task 214). In exemplary embodiments, the processing system 108 displays a graphical representation of the route (or at least a portion thereof) on a navigational map having a corresponding geographic area encompassing one or more of the current aircraft position, the intended destination, and the conditional diversion destination. Additionally, in some embodiments, the processing system 108 automatically updates a flight plan maintained by the FMS 116 to incorporate the route, for example, by inserting the sequence of navigational reference points (and corresponding altitudes or flight levels) of the route into the flight plan in lieu of the original (or previous) sequence of navigational reference points defining the originally planned flight path from the current aircraft position to the intended destination.

The illustrated interim route display process 200 dynamically updates the route in real-time in response to changes to one or more of the time constraints associated with the intended destination (task 216). For example, when the estimated availability time for the intended destination changes (e.g., the airport is expected to be available sooner or later than previously estimated), the loop defined by tasks 208, 210, 212, and 214 may be repeated to update the interim holding route from the current aircraft position in a manner that satisfies or otherwise accounts for the new estimated availability time. Additionally, although not illustrated in FIG. 2, in some embodiments, the loop defined by tasks 208, 210, 212, and 214 may also be repeated in response to receiving updated meteorological information, for example, to reflect new or updated meteorological forecasts or the like.

In exemplary embodiments, the interim route display process 200 monitors for changes in the availability status of the intended destination, and in response to the intended destination becoming available, the interim route display process 200 automatically updates the route to provide a direct path from the current aircraft position to the intended destination (tasks 218, 220). Thus, when the processing system 108 receives indication that the intended destination is available, the processing system 108 determines a sequence of navigational reference points from the current aircraft position to the intended destination that results in the shortest estimated flight time and provides indication of the updated route in lieu of the previously generated interim holding route. In this regard, the interim holding route presented on the navigational map on the display device 104 may be dynamically updated to depict a direct flight path to the intended destination and/or the flight plan implemented by the FMS 116 may be automatically updated to facilitate flying a direct route to the intended destination from the current aircraft position.

While the intended destination is unavailable, the interim route display process 200 monitors the amount of fuel remaining onboard the aircraft and calculates or otherwise determines whether the amount of fuel is greater than a threshold amount of fuel for reaching the diversion destination from the current aircraft position (task 222). In this regard, the fuel threshold generally corresponds to the minimum amount of fuel required to reach the diversion destination from the current aircraft position based on the current and/or forecasted meteorological information between the current aircraft position and the diversion destination and may potentially include a buffer amount of reserve fuel to ensure the aircraft does not run out of fuel. In response to determining the amount of fuel remaining is less than or equal to the threshold, the interim route display process 200 automatically updates the route to provide a direct path from the current aircraft position to the diversion destination (task 224). In this regard, the processing system 108 determines a sequence of navigational reference points from the current aircraft position to the diversion destination that results in the shortest estimated flight time (or alternatively, the minimum amount of fuel consumption) and provides indication of the updated route in lieu of the previously generated interim holding route. Thus, the pilot may be automatically notified of when to divert when continued holding is potentially unsafe without having to mentally assess the current situation (e.g., manually reviewing fuel gauges, weather forecasts, and the like). As described above, the interim holding route presented on the navigational map on the display device 104 may be dynamically updated to depict a direct flight path to the diversion destination and/or the flight plan implemented by the FMS 116 may be automatically updated to facilitate flying a direct route to the diversion destination from the current aircraft position.

Figure 3:
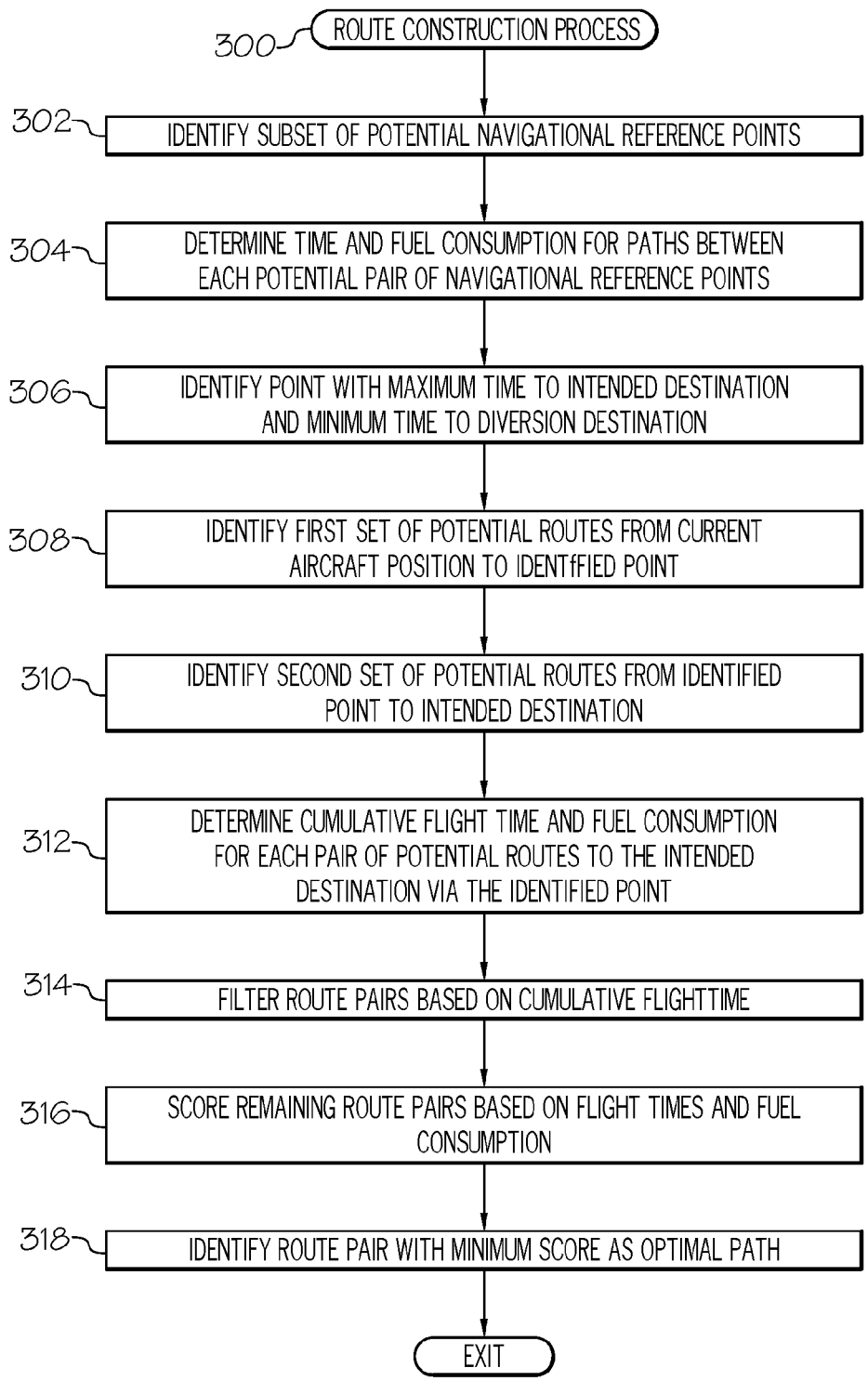
FIG. 3 is a flow diagram of an exemplary route construction process suitable for use with the interim route display process of FIG. 2 in accordance with one or more embodiments.

Referring now to FIG. 3, in an exemplary embodiment, the system 100 is configured to support a route construction process 300 in conjunction with the interim route display process 200 of FIG. 2 (e.g., task 212) and perform additional tasks, functions, and operations described below. The various tasks performed in connection with the illustrated process 300 may be implemented using hardware, firmware, software executed by processing circuitry, or any combination thereof. For illustrative purposes, the following description may refer to elements mentioned above in connection with FIG. 1. In practice, portions of the route construction process 300 may be performed by different elements of the system 100; however, for purposes of explanation, the route construction process 300 may be described herein primarily in the context of being performed by the processing system 108. Again, it should be appreciated that the route construction process 300 may include any number of additional or alternative tasks, may not be performed in the illustrated order, one or more of the tasks may be performed concurrently or omitted, and/or the route construction process 300 may be incorporated into a more comprehensive procedure or process having additional functionality not described in detail herein.

The route construction process 300 begins by identifying, from among a plurality of navigational reference points within an operating region of interest, an initial subset of potential navigational reference points for which the aircraft can traverse while satisfying applicable time constraints (task 302). In this regard, the processing system 108 may identify the initial subset of navigational reference points as those navigational reference points within the operating region encompassing the current aircraft position, the intended destination, and the diversion destination that are within the maximum allowable flight time distance of the intended destination based on the current and/or predicted meteorological information, aircraft fuel consumption and configuration, and the like. For example, for each navigational reference point, the processing system 108 may calculate the estimated flight time from that point to the intended destination based on the current and/or predicted meteorological information for that respective navigational reference point, the intended destination, and the intervening geographic area. When the estimated flight time is less than the maximum allowable flight time distance, the processing system 108 adds or otherwise includes the navigational reference point in the initial subset of potential navigational reference points for the interim holding route and stores or otherwise maintains that estimated flight time in association with the respective navigational reference point. In some embodiments, the initial subset of potential navigational reference points may be further filtered or reduced by only excluding navigational reference points that are not on the same side of the intended destination as the diversion destination (e.g., within ±90° of a direct path between destinations) or between the intended destination and the current aircraft position. For each navigational reference point added to the initial subset of potential navigational reference points, the processing system 108 also calculates the estimated flight time from that point to the diversion destination based on the current and/or predicted meteorological information for that respective navigational reference point, the diversion destination, and the intervening geographic area, and stores or otherwise maintains the estimated flight time to the diversion destination in association with the respective navigational reference point.

For each potential pair of navigational reference points of the initial subset of potential navigational reference points, the route construction process 300 calculates or otherwise determines the estimated travel time and fuel consumption associated with a direct path between the respective pair of navigational reference points (task 304). In this regard, the processing system 108 calculates the estimated flight time and fuel consumption between pairs of navigational reference points based on the current and/or predicted meteorological information for those respective navigational reference points and the intervening geographic area, and stores or otherwise maintains the estimated flight time and fuel consumption in association with that particular path. For example, in accordance with one or more embodiments, the processing system 108 creates a graph data structure representative of the initial subset of potential navigational reference points, where the navigational reference points provide the nodes of the graph and the edges between respective pairs of nodes are associated with the estimated flight time and fuel consumption corresponding to that respective flight path.

The route construction process 300 selects or otherwise identifies the potential navigational reference point having the maximum estimated flight time to the intended destination and the minimum estimated flight time to the diversion destination from the initial subset of potential navigational reference points as an intermediate navigational reference point for the interim holding route (task 306). In this regard, having the interim holding route traversing the navigational reference point having the minimum estimated flight time to the diversion destination reduces the flight time in the event a diversion is declared or detected (e.g., task 222) while subsequently flying the interim holding route.

The route construction process 300 continues by identifying a first set of potential routes from the current aircraft position to the intermediate navigational reference point, identifying a second set of potential routes from the intermediate navigational reference point to the intended destination, and calculates or otherwise determines the estimated travel time and fuel consumption associated with each potential combination or pair of a route to the intermediate navigational reference point selected from the first set and a route to the intermediate navigational reference point selected from the second set (tasks 308, 310, 312). In this regard, the processing system 108 determines the fuel and flight time requirements for each potential route from the current aircraft position to the intended destination via the intermediate navigational reference point having the shortest flight time to the diversion destination.

In exemplary embodiments, the route construction process 300 filters or otherwise excludes one or more combinations of potential route portions based on the estimated availability time for the intended destination, and then scores or otherwise grades the remaining combinations of route portions of the filtered subset to identify an optimal interim holding route based on the scoring (tasks 314, 316, 318). For example, the processing system 108 may initially exclude combinations of potential route portions to/from the intermediate navigational reference point that have a cumulative flight time that would result in the aircraft 102 reaching the intended destination prior to the estimated availability time for the intended destination. Thus, route portion combinations that would result in the aircraft 102 arriving too early and having to continue holding may be eliminated from consideration to prevent the aircraft 102 arriving to the intended destination while it is still unavailable. That said, in situations where all of the route combinations arrive at the intended destination before the estimated availability time, the route construction process 300 may identify the route combination having the longest cumulative flight time as the interim holding route and exit.

In such embodiments, the processing system 108 may also calculate or otherwise determine an estimated holding time based on the difference between the estimated arrival time and the estimated availability time and provide a graphical indication of the estimated holding time at the intended destination in concert with providing a graphical representation of the interim holding route.

In an exemplary embodiment, the processing system 108 calculates a route score for each potential combination of route portions in the filtered subset based on the difference between the estimated arrival time of the respective route combination and the estimated availability time and the difference between the estimated cumulative fuel consumption of the respective route combination and the minimum estimated cumulative fuel consumption of the route combinations in the filtered subset. For example, a route score may be determined as a weighted sum using equation $score_i = w_t(t_i-t_a)^2 + w_f(f_i-f_{min})^2$, where $w_t$ is a weighting factor assigned to the flight time, $w_f$ is a weighting factor assigned to the fuel consumption, $t_i$ is the estimated arrival time determined based on the cumulative flight time of the respective route combination, $t_a$ is the estimated availability time, $f_i$ is the estimated fuel consumption associated with the respective route combination, and $f_{min}$ is the minimum estimated fuel consumption from among the potential route combinations being analyzed. In this regard, the route combination having the lower score may be identified as the optimal interim holding route among the filtered subset based on that combination of route portions being most efficient route in terms of the relative balance of estimated flight time and estimated fuel consumption dictated by the weighting factors.

In some embodiments, the scoring may also account for the estimated flight times to the intended destination and the diversion destination, for example, using equation $$score_i = w_t(t_i - t_a) + w_f(f_i - f_{min}) + \frac{w_d}{t_{d\_i}} + w_a t_{a\_i},$$

where $t_{d\_i}$ is a flight time metric associated with reaching the intended destination using the respective route combination (e.g., the average estimated flight times for direct paths to the intended destination from the various navigational reference points defining the route portions), $t_{a\_i}$ is a flight time metric associated with reaching the diversion destination using the respective route combination (e.g., the average estimated flight times for direct paths to the diversion destination from the various navigational reference points defining the route portions), $w_d$ is a weighting assigned to the intended destination flight time metric, and $w_a$ is a weighting assigned to the diversion destination flight time metric. In this regard, a route combination having the shortest average flight times to the diversion destination and the longest average flight times to the intended destination may be preferentially identified as the optimal interim holding route from among potential routes when balance of the estimated arrival time and estimated fuel consumption among those routes is otherwise equivalent to one another.

Figure 4:
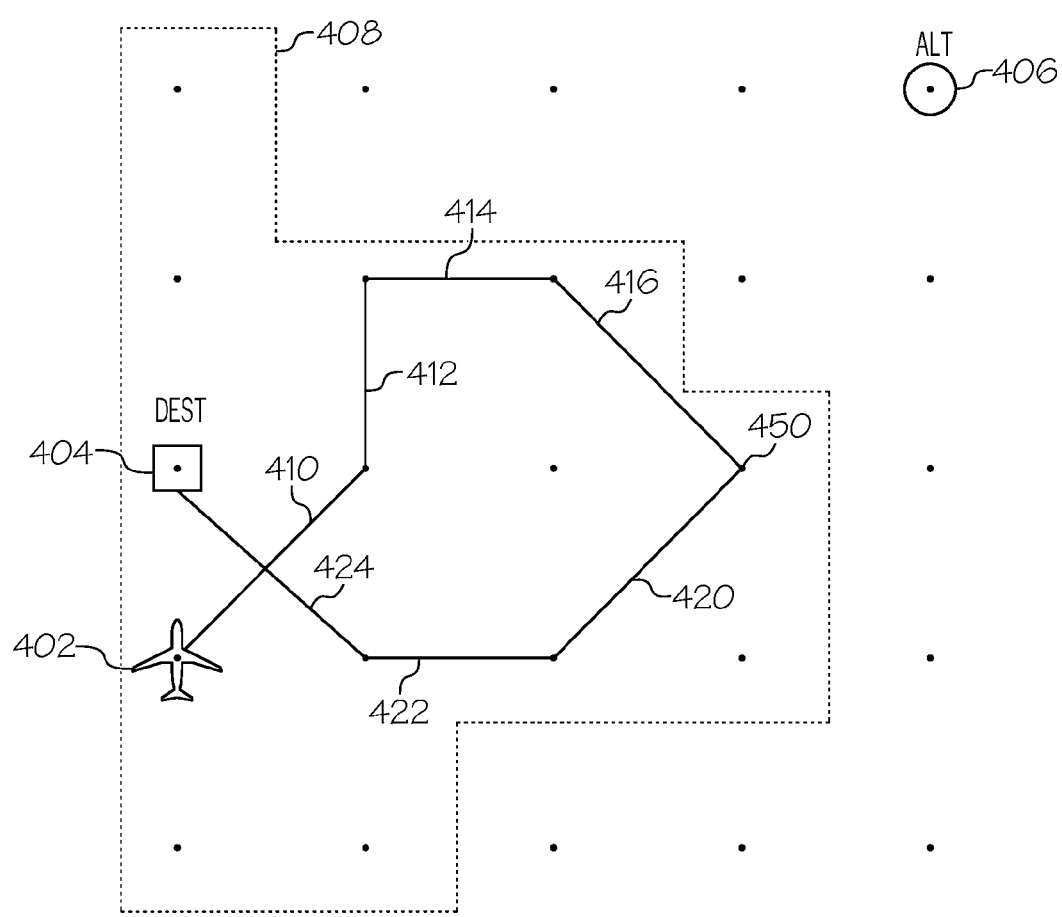
FIGS. 4-5 depict exemplary embodiments of interim routes constructed between a current aircraft position and an intended destination that veer towards a conditional diversion destination in conjunction with the interim route display process of FIG. 2 and the route construction process of FIG. 3 in accordance with one or more embodiments.

FIG. 4 depicts an exemplary embodiment of an interim holding route that may be constructed by the processing system 108 in conjunction with the route construction process 300. As described above, from within the region encompassing the current aircraft position 402, the intended destination 404, and the conditional diversion destination 406, the processing system 108 identifies an initial subset of navigational reference points within the maximum allowable flight time distance of the intended destination 404, represented by region 408 (e.g., task 302). For each potential pair of navigational reference points within the maximum flight time distance region 408, the processing system 108 determines estimated travel times and fuel consumption associated with direct paths between the respective pairs of navigational reference points within the region 408 based on the current and/or forecasted meteorological information for the region 408 and constructs a graph structure representative of the potential route segments within the region 408 (e.g., task 304).

As described above, the processing system 108 identifies an intermediate navigational reference point 450 within the initial subset 408 having the maximum estimated flight time to the intended destination 404 and the minimum estimated flight time to the diversion destination 406 (e.g., task 306). Thereafter, the processing system 108 calculates or otherwise determines the estimated travel time and fuel consumption associated with each potential route within the region 408 from the current aircraft position 402 to the intermediate navigational reference point 450 and each potential route within the region 408 from the intermediate navigational reference point 450 to the intended destination 404 (e.g., task 312). The processing system 108 initially filters the potential combinations of route portions based on the estimated flight times, scores the remaining combinations of route portions based on their respective estimated flight times and estimated fuel consumptions, and then identifies the combination of route portions having the lowest score as the interim holding route. In this regard, FIG. 4 depicts the interim holding route as the combination of a first route portion from the current aircraft position 402 to the intermediate navigational reference point 450 (comprised of route segments 410, 412, 414, 416 between pairs of navigational reference points within the maximum flight time distance region 408) and a second route portion from the intermediate navigational reference point 450 to the intended destination 404 (comprised of route segments 420, 422, 424).

Figure 5:
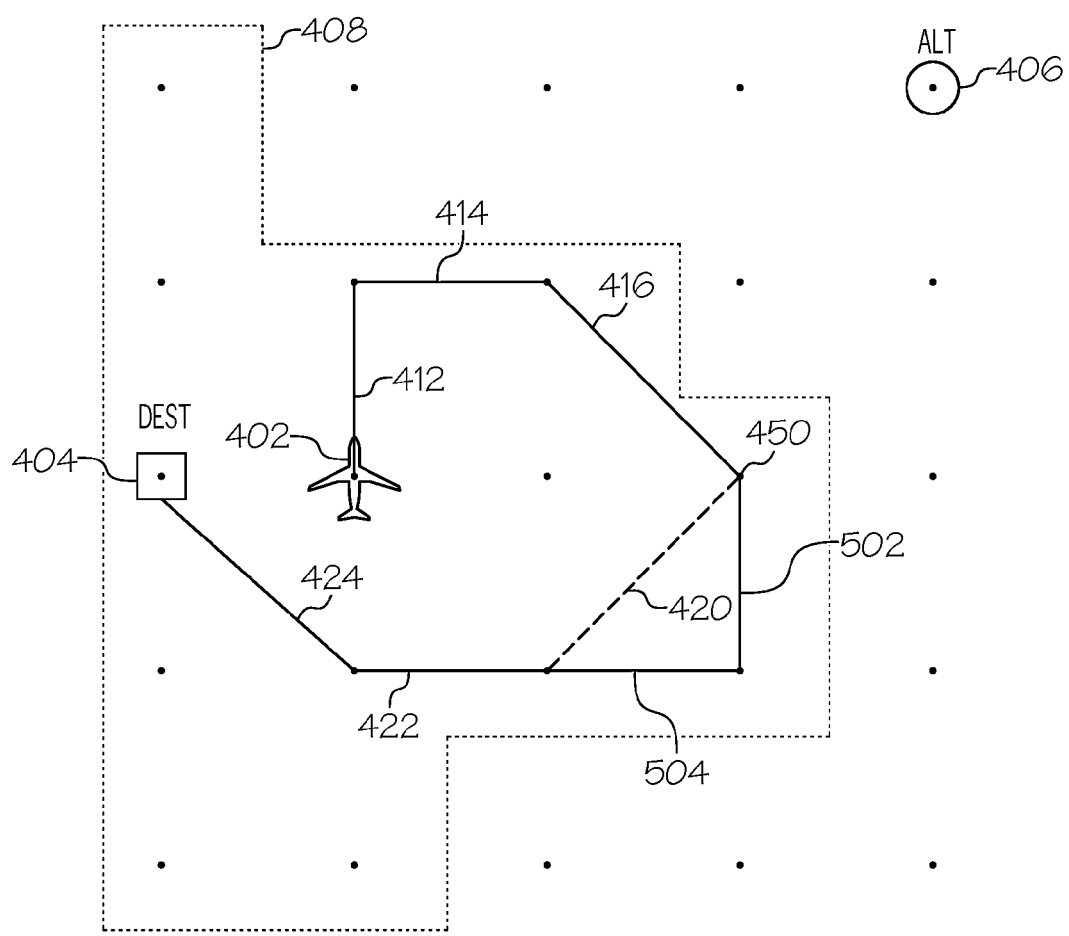

FIG. 5 depicts an exemplary embodiment of how the interim holding route may be dynamically updated in response to a change to an applicable time constraint. In this regard, FIG. 5 depicts a scenario where the estimated availability time for the intended destination 404 is delayed from the initial estimate during execution of the initially determined interim holding route. In response to the delayed estimated availability time for returning to the intended destination 404, the route construction process 300 identifies an updated route portion from the intermediate navigational reference point 450 to the intended destination 404 comprised of route segments 502 and 504 in lieu of previous route segment 420 as having a lower score than the previous route portion comprised of route segments 420, 422, 424 based on the estimated arrival time associated with the updated route portion being closer to the estimated availability time.

FIG. 5 depicts an exemplary embodiment of how the interim holding route of FIG. 4 may be dynamically updated, for example, in response to a change to an applicable time constraint or a change in the meteorological information within the maximum allowable flight distance region 408. In this regard, FIG. 5 depicts a scenario where the estimated availability time for the intended destination 404 is delayed from the initial estimate (or alternatively, the meteorological information within the region 408 decreases the estimated flight time associated with one or more of the route segments 412, 414, 420, 422, 424) during execution of the initially determined interim holding route. In response, the route construction process 300 identifies an updated route portion from the intermediate navigational reference point 450 to the intended destination 404 comprised of route segments 502 and 504 in lieu of previous route segment 420 as having a lower score than the previous route portion comprised of route segments 420, 422, 424 based on the estimated arrival time associated with the updated route portion being closer to the estimated availability time. Thereafter, the interim holding route depicted on the navigational map on the display device 104 may be dynamically updated to include a graphical representation of the updated interim holding route depicted in FIG. 5 in lieu of a graphical representation of the initial interim holding route depicted in FIG. 4 that graphically indicates route segment 420.

Figure 6:
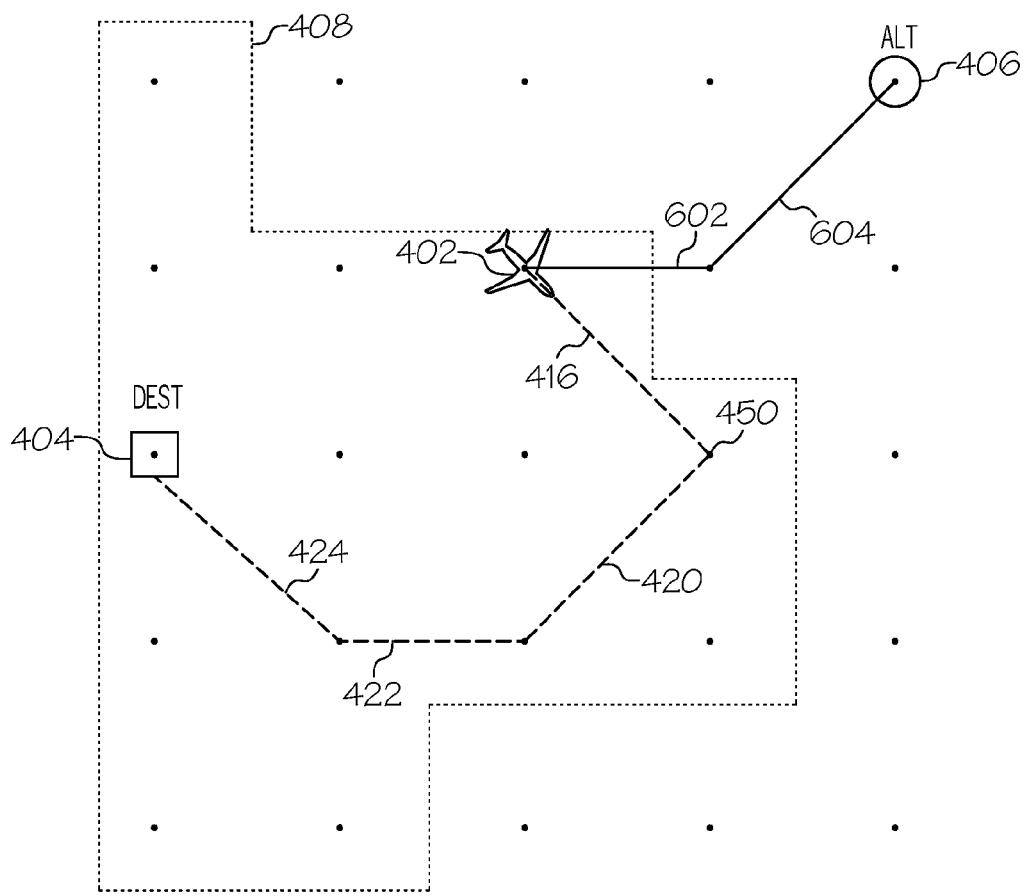
FIG. 6 depicts an exemplary embodiment of the interim route of FIG. 4 being dynamically updated to provide a direct route to the intended destination in conjunction with the interim route display process of FIG. 2 in accordance with one or more embodiments.

FIG. 6 depicts another exemplary embodiment of how the interim holding route of FIG. 4 may be dynamically updated, for example, in response to determining the amount of fuel remaining onboard is insufficient to reach the intended destination 404 or in response to the estimated availability time for the intended destination 404 being delayed beyond the remaining flight time capabilities of the aircraft 102. In response, the interim route display process 200 identifies a direct route from the current aircraft position 402 to the diversion destination 406 and automatically displays a graphical representation of the updated route depicted in FIG. 6 comprised of segments 602, 604 on the navigational map on the display device 104 in lieu of graphically indicating the remaining segments 416, 420, 422, 424 of the interim holding route. Accordingly, when changes in the meteorological conditions, fuel consumption, destination status, or other factors necessitate a diversion, the pilot may be automatically apprised of the current condition without having to divert situational awareness to manually assess the current situation. Additionally, by virtue of the interim holding route veering towards the diversion destination 406, the flight time for reaching the diversion destination 406 may be reduced when a diversion is declared during execution of the interim holding route.

Figure 7:
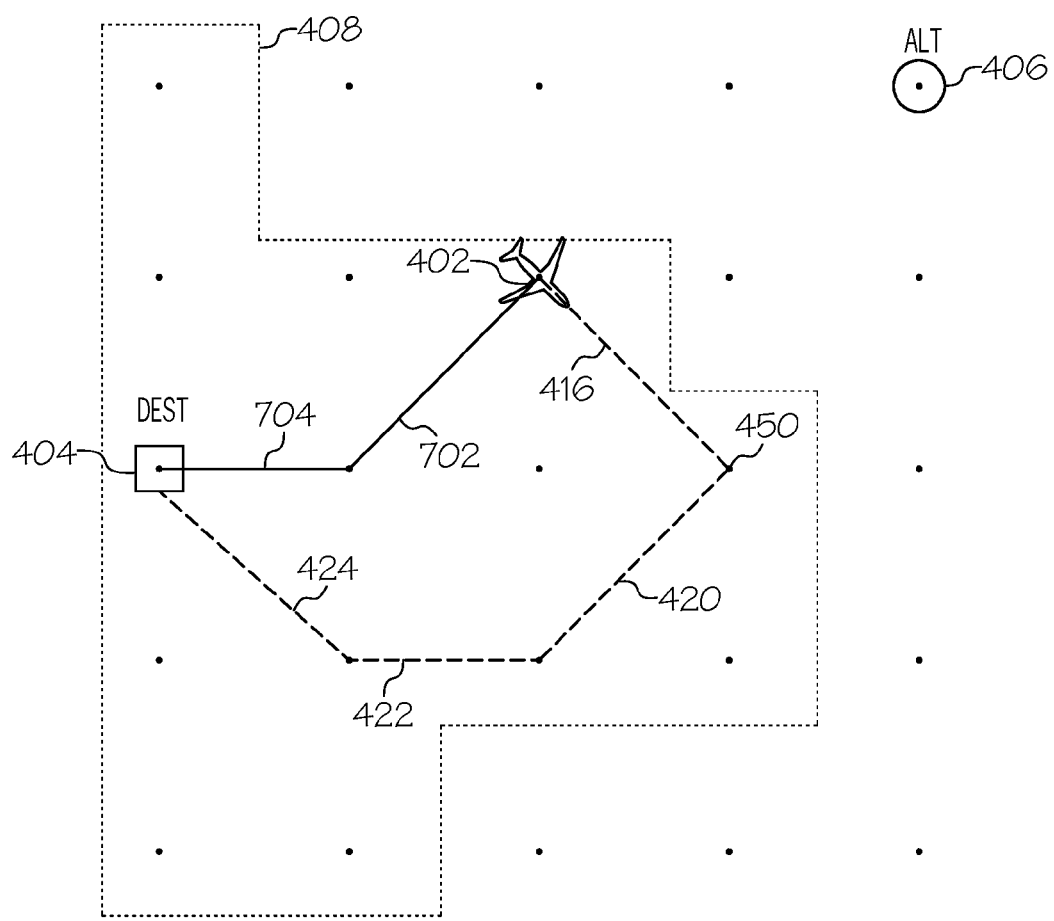
FIG. 7 depicts an exemplary embodiment of the interim route of FIG. 4 being dynamically updated to provide a direct route to the diversion destination in conjunction with the interim route display process of FIG. 2 in accordance with one or more embodiments.

FIG. 7 depicts another exemplary embodiment of how the interim holding route of FIG. 4 may be dynamically updated in response to the intended destination 404 becoming available earlier than anticipated. In response, the interim route display process 200 identifies a direct route from the current aircraft position 402 to the intended destination 404 and automatically displays a graphical representation of the updated route depicted in FIG. 7 comprised of segments 702, 704 on the navigational map on the display device 104 in lieu of graphically indicating the remaining segments 416, 420, 422, 424 of the interim holding route. In this scenario, processes 200, 300 described herein ensure that the aircraft 102 can return to the intended destination 404 within an amount of time that is acceptable to the pilot, airline or other aircraft administrator, or the like by virtue of the interim holding route being constructed within a maximum allowable flight distance region 408.

Figure 8:
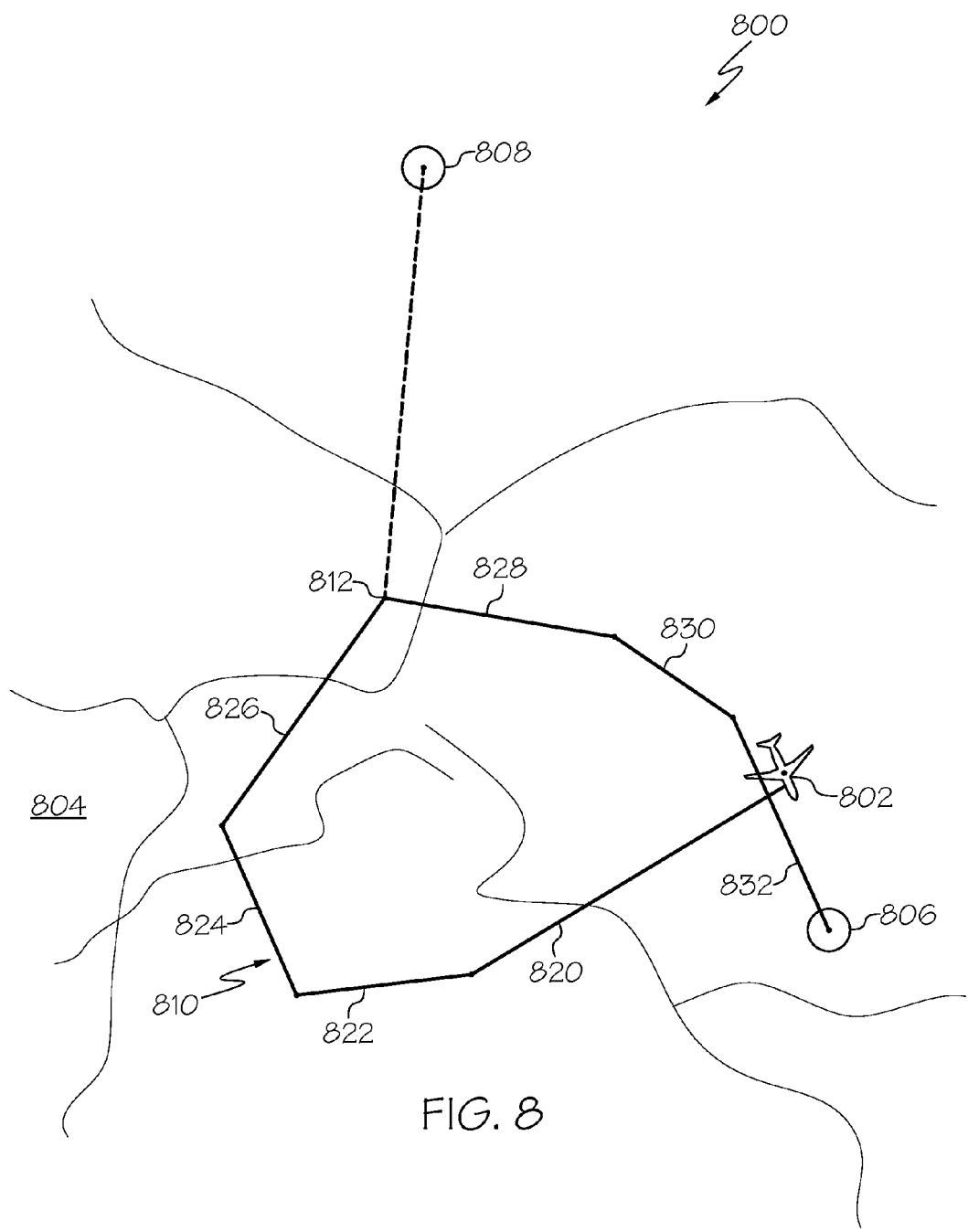
FIG. 8 depicts exemplary navigational map display suitable for display on a display device associated with the aircraft in the system of FIG. 1 in accordance with one or more embodiments of the exemplary interim route display process of FIG. 2.

FIG. 8 depicts an exemplary navigational map display 800 that may be displayed, rendered, or otherwise presented on the display device 104 in conjunction with the interim route display process 200 of FIG. 2. The display system 110 and/or processing system 108 displays and/or renders the navigational map 800 on the display device 104. The illustrated navigational map 800 includes a graphical representation 802 of the aircraft 102 overlaid or rendered on top of a background 804. The background 804 comprises a graphical representation of the terrain, topology, navigational reference points, airspace designations and/or restrictions, or other suitable items or points of interest corresponding to the currently displayed area of the navigational map 800, which may be maintained in a terrain database, a navigational database, a geopolitical database, or another suitable database. For example, the display system 110 may render a graphical representation of navigational aids (e.g., VORs, VORTACs, DMEs, and the like) and airports within the currently displayed geographic area of the navigational map 800 overlying the background 804. Some embodiments of navigational map 800 may also include graphical representations of airspace designations and/or airspace restrictions, cities, towns, roads, railroads, and other geo-political information. In addition, depending on the embodiment, the interim route display process 200 may render other real-time flight related information that is within the geographic area corresponding to the currently displayed area of the navigational map 800 or within a particular proximity of the aircraft, such as, for example, weather conditions, radar data, neighboring air traffic, and the like, as will be appreciated in the art. Although FIG. 8 depicts a top view (e.g., from above the aircraft 802) of the navigational map 800 (alternatively referred to as a lateral map or lateral view), in practice, alternative embodiments may utilize various perspective views, such as side views, three-dimensional views (e.g., a three-dimensional synthetic vision display), angular or skewed views, and the like. The displayed area of the navigational map 800 corresponds to the geographic area that is currently displayed in the navigational map 800, that is, the field of view about the center location of the navigational map 800. As used herein, the center location of the navigational map 800 comprises a reference location for the middle or geometric center of the navigational map 800 which corresponds to a geographic location.

In an exemplary embodiment, the navigational map 800 is associated with the movement of the aircraft 102, and the aircraft symbology 802 and/or background 804 refreshes or otherwise updates as the aircraft 102 travels, such that the graphical representation of the aircraft 802 is positioned over the terrain background 804 in a manner that accurately reflects the current (e.g., instantaneous or substantially real-time) real-world positioning of the aircraft 102 relative to the earth. In some embodiments, the aircraft symbology 802 is shown as traveling across the navigational map 800 (e.g., by updating the location of the aircraft symbology 802 with respect to the background 804), while in other embodiments, the aircraft symbology 802 may be located at a fixed position on the navigational map 800 (e.g., by updating the background 804 with respect to the aircraft graphic 802 such that the map 800 is maintained centered on and/or aligned with the aircraft graphic 802). Additionally, depending on the embodiment, the navigational map 800 may be oriented in a cardinal direction (e.g., oriented north-up so that moving upward on the map 800 corresponds to traveling northward), or alternatively, the orientation of the navigational map 800 may be track-up or heading-up (i.e., aligned such that the aircraft symbology 802 is always traveling in an upward direction and the background 804 adjusted accordingly).

In some embodiments, the map 800 may be centered on the aircraft 802 such that the center location of the navigational map 800 corresponds to the current location of the aircraft 802. In this regard, the center location of the navigational map 800 may be updated or refreshed such that it corresponds to the instantaneous location of the aircraft 102 as the aircraft travels, as will be appreciated in the art. In alternative embodiments, the center location of the navigational map 800 may correspond to a geographic location that is independent of the current location of the aircraft 102, for example, when a user manipulates a user input device 106 to scroll the displayed area of the navigational map or select a portion of the displayed area that does not include the aircraft symbology 802.

The illustrated navigational map 800 includes a graphical representation of an interim holding route 810 from the current position of the aircraft 802 to the intended destination airport 806 that veers towards a conditional diversion destination airport 808 without exceeding a maximum allowable flight time distance of the intended destination airport 806 as described above in the context of FIGS. 2-4. In this regard, the processing system 108 and/or display system 110 graphically indicates route segments (or airways) between navigational reference points, thereby highlighting an initial holding route portion (comprised of segments 820, 822, 824, 826) from the current aircraft location that traverses an intermediate navigational reference point 812 having a minimum estimated flight time to the conditional diversion destination airport 808 and a subsequent holding route portion (comprised of segments 828, 830, 832) from the intermediate navigational reference point 812 to the intended destination airport 806 to return to the intended destination airport 806 at or near the time that the intended destination airport 806 is expected to become available.

Figure 9:
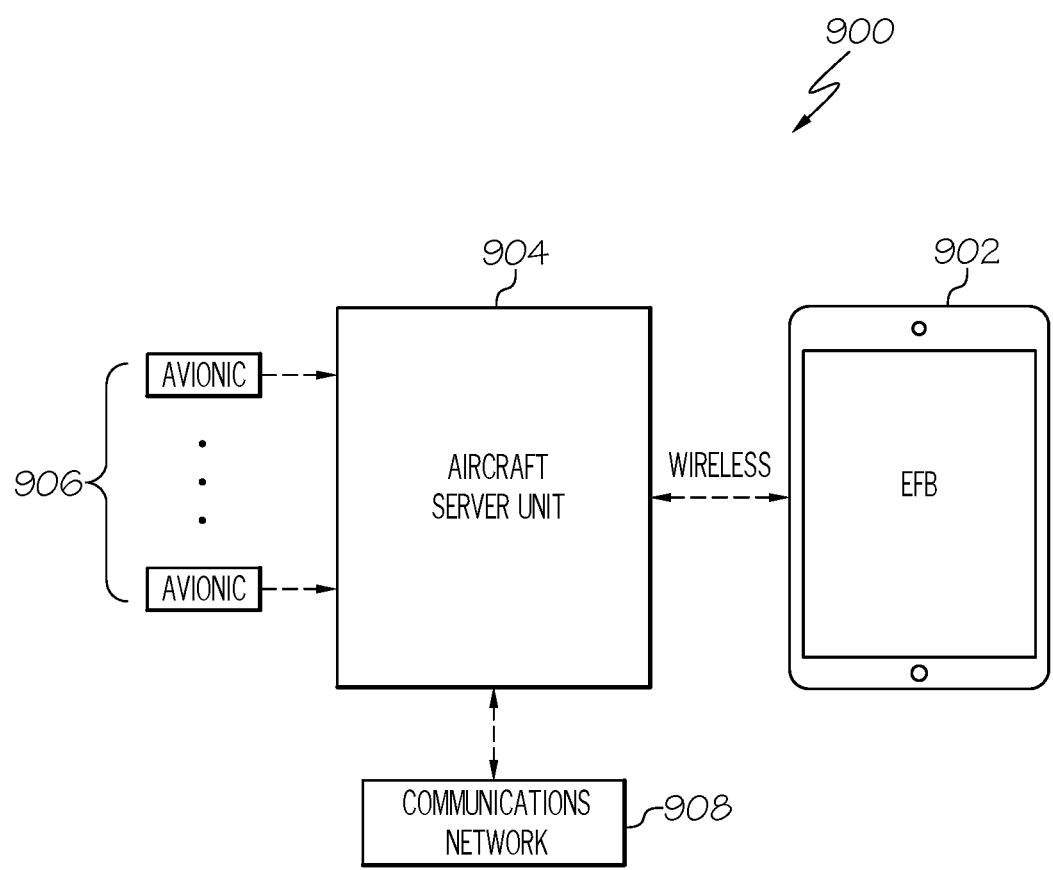
FIG. 9 depicts an exemplary embodiment of an electronic flight bag (EFB) system suitable for implementing the interim route display process of FIG. 2 and the route construction process of FIG. 3 in conjunction with the aircraft system of FIG. 1 in accordance with one or more embodiments.

FIG. 9 depicts an exemplary embodiment of an electronic flight bag (EFB) system 900 suitable for implementing the subject matter described herein. The EFB system includes an electronic device 902 (alternatively referred to as the EFB) that is communicatively coupled to a host device 904 that is communicatively coupled to the avionics systems 906 onboard an aircraft (e.g., avionics systems 112, 114, 116, 118, 120). The host device 904 generally represents a computer system configured support the processes 200, 300 described herein and provide corresponding indications of the interim holding route on the electronic device 902, and for purposes of explanation, but without limitation, the host device 904 is referred to herein as a server unit (or server). In this regard, the host server 904 includes at least a processing system (e.g., processing system 108) and/or other hardware computing resources along with one or more data storage elements (or memory) capable of storing instructions, that, when read and executed by the processing system, cause the host server 904 to generate or otherwise support the processes 200, 300 described herein. The host server 904 may also be coupled to a communications network 908, which may be utilized to receive data and/or information (e.g., meteorological information, or the like) in conjunction with processes 200, 300 and/or to support communications with the electronic device 902.

In exemplary embodiments, the electronic device 902 is realized as a laptop or notebook computer, a tablet computer, or another suitable computing device configured to provide EFB-functionality, and accordingly, the electronic device 902 is alternatively referred to herein as an EFB. The EFB 902 includes at least display device (e.g., display device 104) and a processing system (e.g., processing system 108 and/or display system 110), a data storage element (or memory) configured to support generating graphical representations of the interim holding route or otherwise provide indications pertaining to the interim holding route as described above. In this regard, the EFB 902 may also generate or otherwise provide a navigational map (e.g., map 800) pertaining to the operation of the aircraft.

In one or more embodiments, a pilot of the aircraft utilizes the EFB 902 to initiate the processes 200, 300 described above and input or otherwise provides the applicable constraints the pilot would like to be utilized when constructing the interim holding route (e.g., tasks 202, 204, 206). Thereafter, the EFB 902 may transmit or otherwise provide indication of the desire to perform the processes 200, 300 to the server 904 along with the constraints defining the interim holding route. The server 904 accesses the avionics systems 906 and/or the communications network 908 to receive or otherwise obtain the current position of the aircraft, the current amount of fuel remaining onboard the aircraft, the intended destination for the original flight plan, the meteorological information for the region of interest encompassing the intended and conditional destinations along with the current aircraft position, and the like. Thereafter, the server 904 identifies the optimal interim holding route and provides indication of the interim holding route to the EFB 902, which, in turn, generates or otherwise provides a graphical indication of the interim holding route on the display of the EFB 902 (e.g., by highlighting or rendering the interim holding route 810 overlying the terrain 804 of a navigational map 800 displayed by the EFB 902). Thus, the pilot may utilize the EFB 902 to assess or otherwise analyze the interim holding route and operate the aircraft accordingly.

By virtue of the subject matter described herein, the pilot or other vehicle operator can quickly ascertain how to operate a vehicle en route to an intended destination in a manner that accounts for the unavailability (or inaccessibility) of that destination to minimize fuel consumption, minimize holding time at the intended destination, minimize travel time to a conditional diversion destination, and the like, while also satisfying any other temporal, spatial, or safety constraints applicable to the current situation. In this regard, a pilot can focus on operating the aircraft with improved situational awareness by reducing the need for the pilot to actively manage one or more of the fuel remaining onboard for alternately reaching the intended destination or the diversion destination, the difference between the estimated arrival time at the intended destination and the expected availability time, the estimated flight time (or distance) between the aircraft and the intended destination, and the like. Thus, unnecessary fuel consumption or undesirably prolonged flight time can be avoided in the event that the flight needs to be diverted, while at the same time minimizing holding time at the intended destination and reducing flight time to the intended destination if it becomes available earlier than anticipated.

As described above, the subject matter can also account for current (or real-time) meteorological information as well as forecasted meteorological information, the current (or real-time) configuration of the aircraft as well as predicted configurations of the aircraft, and the like, thereby improving the performance of the interim holding route. Additionally, the interim holding route can be dynamically updated to account for changes to the meteorological information, changes to the aircraft configuration (e.g., a mechanical problem or the like), changes to the estimated availability of the intended destination, and the like. By reducing pilot workload in an otherwise complex situation, the pilot's situational awareness with respect to current operations is improved, which, in turn, improves safety.

For the sake of brevity, conventional techniques related to graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:
1. A system comprising:
  a display device having a map associated with a vehicle displayed thereon;
  an input device to obtain one or more time constraints for an intended destination for the vehicle, the one or more time constraints including an estimated availability time and a maximum travel time from the intended destination; and a processing system coupled to the display device and the input device to:
- identify, from within a region encompassing a current position of the vehicle, the intended destination, and a conditional diversion destination, a plurality of points within the maximum travel time of the intended destination;
- identify, from among the plurality of points, an intermediate point having a minimum travel time to the conditional diversion destination;
- construct an interim route from the current position of the vehicle to the intended destination that deviates towards the conditional diversion destination and traverses the intermediate point based at least in part on the one or more time constraints for the intended destination by:
  - determining, for each potential route combination of a plurality of potential route combinations from the current position of the vehicle to the intended destination via the intermediate point, a respective fuel consumption and a respective estimated arrival time associated with the respective combination;
  - determining, for each potential route combination, a respective first difference between a respective fuel consumption associated with the respective route combination and a minimum fuel consumption among the plurality of potential route combinations;
  - determining, for each potential route combination, a respective second difference between a respective estimated arrival time associated with the respective route combination and the estimated availability time;
  - determining, for each potential route combination, a respective route score comprising a weighted sum of the respective first difference and the respective second difference; and
  - identifying the interim route as the potential route combination having a lowest respective route score from among the plurality of potential route combinations; and
- display a graphical representation of the interim route on the map.

2. A method of facilitating an aircraft landing at an intended destination, the method comprising:
- obtaining a current position of the aircraft;
- obtaining one or more time constraints for the intended destination, the one or more time constraints comprising an estimated availability time associated with the intended destination and an allowable flight time from the intended destination;
- determining an interim route from the current position to the intended destination that terminates at the intended destination at or after the estimated availability time and veers towards a conditional diversion destination based at least in part on the one or more time constraints for the intended destination, wherein positions along a path defined by the interim route are maintained within the allowable flight time from the intended destination; and
- displaying a graphical representation of the interim route on a display device.

3. The system of claim 1, wherein:
the one or more time constraints comprise an allowable flight time from the intended destination; and
a path defined by the interim route is maintained within the allowable flight time from the intended destination.

4. The method of claim 2, further comprising:
- obtaining an updated value for at least one of the one or more time constraints;
- obtaining an updated position of the aircraft;
- determining an updated interim route from the updated position to the intended destination that veers towards the conditional diversion destination based on the updated value; and
- displaying a graphical representation of the updated interim route on the display device in lieu of the graphical representation of the interim route.

5. The method of claim 2, further comprising:
- determining a fuel remaining onboard the aircraft is less than a threshold; and
- in response to determining the fuel remaining onboard the aircraft is less than the threshold:
  - obtaining an updated position of the aircraft;
  - generating a direct route from the updated position to the conditional diversion destination; and
  - displaying a graphical representation of the direct route on the display device in lieu of the graphical representation of the interim route.

6. The method of claim 2, further comprising:
- receiving indication of availability of the intended destination; and
- in response to the indication of availability:
  - obtaining an updated position of the aircraft;
  - generating a direct route from the updated position to the intended destination; and
  - displaying a graphical representation of the direct route on the display device in lieu of the graphical representation of the interim route.

7. The method of claim 2, further comprising obtaining meteorological information for a region encompassing the intended destination, the current position of the aircraft, and the conditional diversion destination, wherein determining the interim route comprises determining the interim route based at least in part on the one or more time constraints and the meteorological information.

8. The method of claim 2, wherein determining the interim route comprises:
- identifying an intermediate point between the intended destination and the conditional diversion destination from among a plurality of points based on the one or more time constraints;
- identifying a first set of route portions from the current position to the intermediate point;
- identifying a second set of route portions from the intermediate point to the intended destination; and
- identifying the interim route as a combination of a first route portion of the first set and a second route portion of the second set.

9. The method of claim 8, further comprising scoring each combination of a first one of the first set of route portions and a second one of the second set of route portions based on one or more of a cumulative flight time associated with the respective combination and a cumulative fuel consumption associated with the respective combination, wherein identifying the interim route comprises identifying an optimal combination based on the scoring.

10. The method of claim 2, further comprising displaying a map on the display device, wherein the map includes a graphical representation of the aircraft at the current position, a graphical representation of at least one of the intended destination and the conditional diversion destination, and the graphical representation of at least a portion of the interim route.

11. A computer-readable medium having computer-executable instructions stored thereon that, when executed by a processing system coupled to the display device, cause the processing system to perform the method of claim 2.

12. A method comprising:
obtaining, from a system onboard a vehicle, a current position of the vehicle;
obtaining an indication of an estimated availability time for a destination for the vehicle;
identifying a conditional destination for the vehicle;
obtaining, via a user input device, a maximum travel time from the conditional destination;
identifying, via a processing system, a plurality of points from within a region encompassing the destination, the conditional destination and the current position as being within the maximum travel time;
identifying an intermediate point between the destination and the conditional destination from among the plurality of points having a minimum travel time to the conditional destination;
identifying a first set of route portions from the current position to the intermediate point;
identifying a second set of route portions from the intermediate point to the intended destination; and
constructing a route from the current position of the vehicle and terminating at the destination that deviates towards the conditional destination as a combination of a first route portion of the first set and a second route portion of the second set, wherein an estimated arrival time at the destination for the route is at or after the estimated availability time; and
displaying a graphical representation of the route on a display device.

13. The method of claim 12, further comprising displaying a map associated with the current position of the vehicle on the display device, wherein the map includes a graphical representation of the vehicle at the current position, a graphical representation of at least one of the destination and the conditional destination, and the graphical representation of at least a portion of the route.

14. A method comprising:
obtaining, from a system onboard a vehicle, a current position of the vehicle;
obtaining an indication of an estimated availability time for a destination for the vehicle;
identifying a conditional destination for the vehicle;
identifying, via a processing system, an intermediate point between the destination and the conditional destination from among a plurality of points having a minimum travel time to the conditional destination;
identifying a first set of route portions from the current position to the intermediate point;
identifying a second set of route portions from the intermediate point to the intended destination;
determining, for each combination of a first one of the first set of route portions and a second one of the second set of route portions, a respective fuel consumption and a respective estimated arrival time associated with the respective combination;
determining, for each combination of a first one of the first set of route portions and a second one of the second set of route portions, a respective first difference between a respective fuel consumption associated with the respective combination and a minimum fuel consumption among a plurality of combinations of a first one of the first set of route portions and a second one of the second set of route portions;
determining, for each combination of a first one of the first set of route portions and a second one of the second set of route portions, a respective second difference between a respective estimated arrival time associated with the respective combination and the estimated availability time;
determining, for each combination of a first one of the first set of route portions and a second one of the second set of route portions, a respective route score comprising a weighted sum of the first difference and the second difference; and
identifying a route from the current position of the vehicle and terminating at the destination that deviates towards the conditional destination as the combination of the first route portion of the first set and the second route portion of the second set having a lowest respective route score from among the plurality of combinations of a first one of the first set of route portions and a second one of the second set of route portions, wherein an estimated arrival time at the destination for the route is at or after the estimated availability time; and
displaying a graphical representation of the route on a display device.

* * * * *